April 3, 1945.     R. C. JORDAN     2,372,674
CONDUIT SUPPORTING DEVICE
Filed Feb. 15, 1943     2 Sheets-Sheet 1

Inventor
RUSS CLYDE JORDAN
By R. S. Berry
Attorney

April 3, 1945.  R. C. JORDAN  2,372,674
CONDUIT SUPPORTING DEVICE
Filed Feb. 15, 1943  2 Sheets-Sheet 2
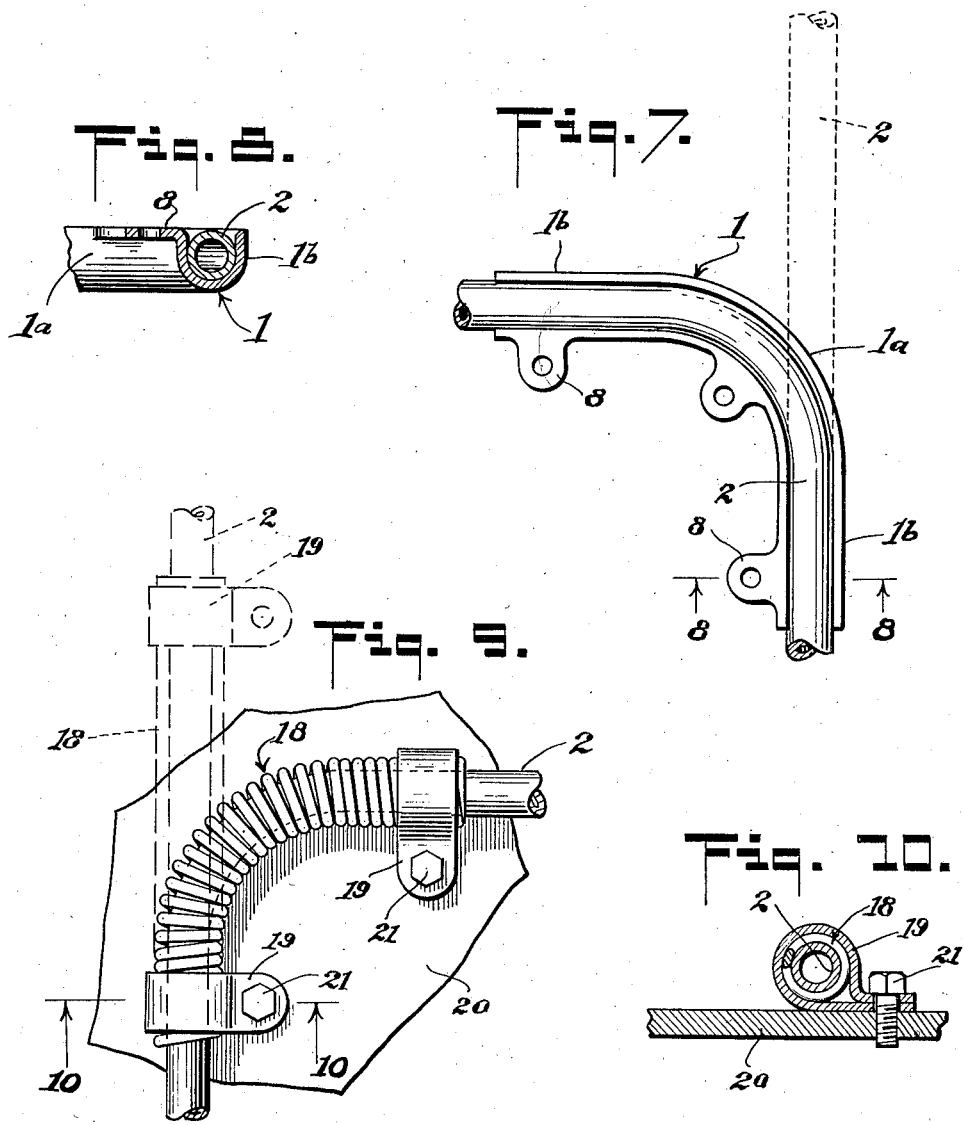

Patented Apr. 3, 1945

2,372,674

UNITED STATES PATENT OFFICE 2,372,674

CONDUIT SUPPORTING DEVICE

Russ Clyde Jordan, Van Nuys, Calif., assignor to Adel Precision Products Corp., a corporation of California Application February 15, 1943, Serial No. 476,001

5 Claims. (Cl. 248—65)

This invention relates in general to devices for supporting on the structural or frame parts of aircraft, the fluid conducting and other conduit lines which extend throughout the aircraft and must be supported at various points along their length to prevent the derangement, damage and wear thereof that would otherwise be likely to occur as a result of the vibration and other stresses developed in aircraft.

More particularly this invention relates to and has for an object the provision of a conduit supporting device which is especially constructed for use in connection with bendable conduit lines made of recently developed plastics or like non-metallic material and now being used in aircraft in place of metal conduits and wherein such lines are bent to form a curved portion in order to traverse a corner formed by walls of frame members, or to extend the conduit angularly over or relative to such walls or members, the curved portion of the conduit and the straight reaches adjacent said curved portion being closely embraced by the supporting device and secured thereby to said walls or frame members to insure line stability and protection and prevent derangement and wear.

Another object of my invention is to provide a conduit support of the character described which includes an elongated curvilinear channeled member adapted to receive the plastic conduit in the channel thereof and to be secured to wall or frame members so as to enclose and form a protective armor as well as a close fitting support for the conduit line.

A further object is to provide a conduit support of the character described in which the curvilinear channeled member is curved on a radius within safe limits to serve as a guide in bending the plastic conduit, in that the latter is bent to conform to the curve of the former and at the same time inserted or depressed into the channel thereof, thereby preventing kinking of the conduit as a result of bending it too sharply.

Another object is to provide a conduit support such as described which conforms closely in cross section to the cross section of the plastic conduit throughout more than half the circumference of the latter so that it will tend to restore the conduit in case of deformation thereof from a cylindrical cross section, and at the same time tightly hold the conduit and reinforce it at and adjacent the bend or curve therein.

Yet another object is to provide a conduit support which includes a straight conduit embracing sleeve that is placed on a straight conduit to surround the same and then bent with the conduit to the desired extent so as to traverse corners or extend angularly relative to the walls or frame members, the bendable supporting sleeve acting as a reinforcing covering and support for the plastic conduit and being fastened to the related walls or members to support the conduit at such points.

Another object of my invention is to provide a conduit supporting device of the character described in which a base plate is provided for co-operation with the curved channeled conduit-receiving member so that the plate and member completely enclose the conduit as a protective armor and support therefor, said base plate having the channeled member secured thereto and being secured to the walls or structural members of the aircraft to support the device thereon.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 7 is a plan view of the channeled member showing the conduit bent to lie in the channel thereof, in full lines, and showing in dotted lines how the conduit is positioned relative to said member before being bent to lie in the channel;

Fig. 8 is a cross section on line 8—8 of Fig. 7;

Fig. 9 is a front elevation of a modified form of my invention;

Fig. 10 is a cross sectional view taken on the line 10—10 of Fig. 9.

Figure 1:
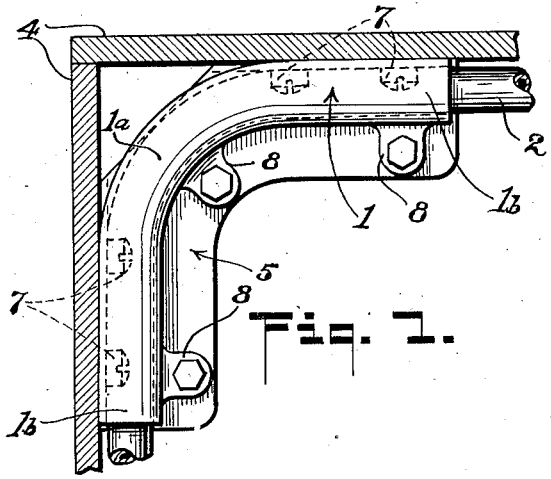
Fig. 1 is a front elevation of a supporting device embodying my invention, as installed.

Referring to the drawings more specifically, it is seen that my invention as to the forms thereof shown in Figs. 1 to 8 inclusive primarily includes a rigid, elongated, curvilinear conduit-supporting member 1 made of a light sheet metal or of one of the newer plastic materials and having a U-shaped cross section throughout its length affording a channel for reception of a new type of bendable plastic conduit 2 such as now being used for fluid conducting and other purposes in aircraft.

Figure 3:
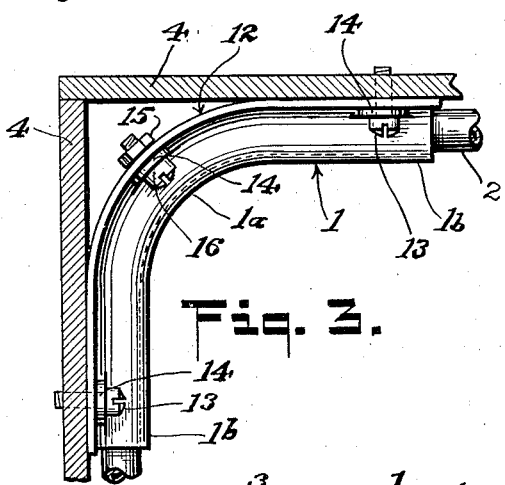
Fig. 3 is an elevational view of a modified form of the invention.
Figure 4:
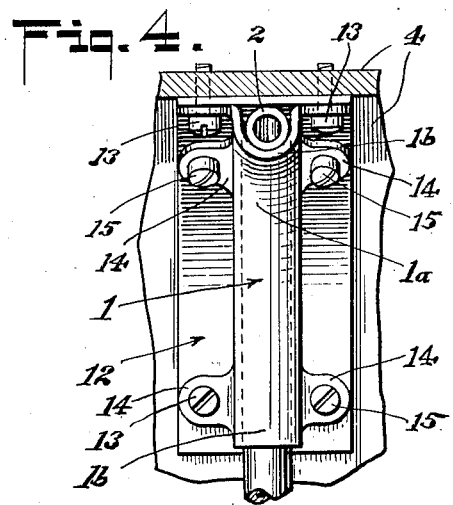
Fig. 4 is an end elevation of the device shown in Fig. 3.
Figure 5:
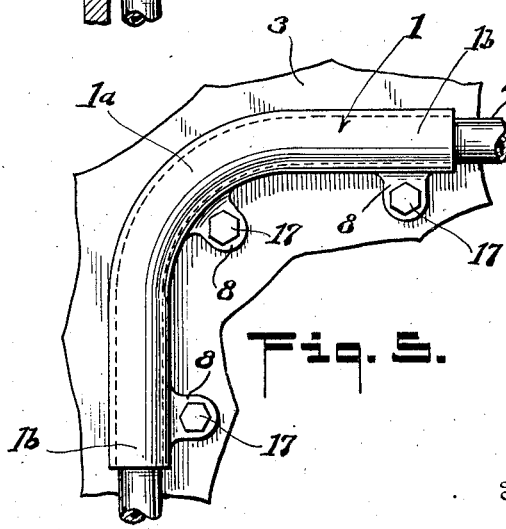
Fig. 5 is an elevational view of another modified form of my invention.
Figure 6:
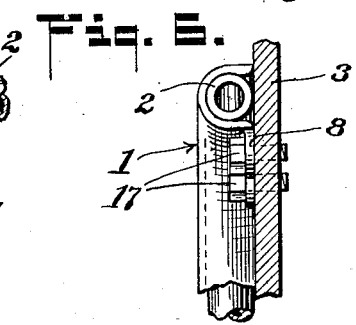
Fig. 6 is an end elevation of the device as shown in Fig. 6.

The purpose of the channeled member 1 hereof is to provide a support, a protective armor, a bending guide and a supported conduit-conforming covering and seat for the conduit line, where said line is bent to change the direction of extension thereof along the wall or frame member 3 as seen in Figs. 5 and 6, or to traverse a corner as formed by angularly related walls or frame members 4 as shown in Figs. 1 to 4 inclusive.

In accordance with this invention the channeled member 1 is formed with a curved intermediate portion 1a and straight end portions 1b so that the latter extend in opposite directions or in angular relation to one another, the curve being on a radius within safe limits to prevent damage of the bendaable plastic conduit 2 in the bending thereof.

As shown in Figs. 7 and 8 the conduit while being bent is forced into the channel of the member 1 and lies in close conformation to and contacts the conduit for more than half the circumference of the latter thereby enclosing the curved portion of the conduit and the straight portions next adjacent thereto.

Figure 2:
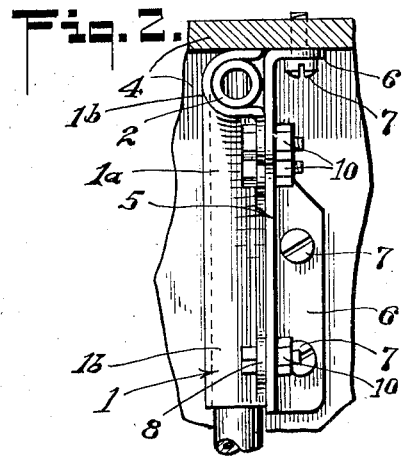
Fig. 2 is an end elevation of the device as installed.

As shown in Figs. 1 and 2 a flat and substantially L-shaped base plate or bracket 5 is provided for cooperation with the channeled member 1 to enclose the conduit therebetween and to secure the conduit support in place, said base plate having apertured attaching flanges or ears 6 adjacent its ends disposed to lie against and be secured to the angularly related walls 4 by means of the fastening elements 7, thereby holding the base plate edgewise against said walls. The channeled member 1 is provided along one longitudinal margin with apertured ears 8 which are adapted to lie against and be secured to the plate 5 by means of bolts provided with nuts 10, with the channeled side opposed to the base plate. The ears 8 are preferably at the ends and centrally of the ends of the channeled member 1 to provide for an even and secure fastening thereof to the base plate in close contact therewith along its edges, with the conduit also engaged with the base plate as shown in Fig. 2. Preferably the member 1 is secured on the plate 5 so that side walls of the straight portions 1b will abut the walls 4. It is now seen that the support of my invention as shown in Figs. 1 and 2 includes two parts, the channeled member 1 and the base plate 5, and that these parts may be assembled on the conduit before installation of the latter in the aircraft, or the base plate first fastened to the walls or members 4 and the channeled member with the conduit therein, then secured to the base plate.

In Figs. 3 and 4, wherein a modified form of my invention is shown, the walls or members of the aircraft, also the channeled member are designated by the same reference characters as in Figs. 1 and 2. In this form a base plate 12 is in the form of a flat rectangular plate, curved to conform to the curvature of the member 1 and is applied to the walls 4 to lie flatwise thereon, being secured to said walls by the fastening elements 13. No attaching ears or flanges are necessary on the base plate 12, but the channeled member 1 is provided with attaching ears 14 along each longitudinal edge secured to the base plate by the fastenings 13 and the nuts 15 and bolts 16, and otherwise is of the same shape and construction as shown in Figs. 1 and 2. In this modified form the member 1 lies along the longitudinal center line of the base plate 12 instead of along one edge of the base plate as in Figs. 1 and 2.

As shown in Figs. 5 and 6 a channeled member 1 identical with that shown in Figs. 1 and 2 is applied directly to a flat surface of the wall 3 by means of fastenings 17 instead of being fastened to a base plate as shown in Figs. 1, 2, 3, and 4. In this arrangement the wall 3 and member 1 enclose the conduit which bears against said wall and said member as shown in Fig. 6.

In all the forms of the invention shown in Figs. 1 to 7 inclusive, the channeled member of the device is attachable to an aircraft in such a manner that the open side of the channel is throughout its length positionable in an adjacent, overlying relation to plane surfaces or wall portions, either with or without the interposition of a base plate so that in all cases the mouth of the channel is provided with a closure. Under conditions wherein it is desired to encumber the conduit as little as possible before mounting it, the base plate will first be securely attached by the screws 7 or other means, and then the channeled member, after having been applied to the conduit, will be bolted to said base plate.

Another modified form of my invention as shown in Figs. 9 and 10 comprises a bendable helically coiled supporting member 18 corresponding to a spring and adapted to surround the conduit like a sleeve. This coiled member is placed on the conduit while the latter is straight as indicated by the dotted lines in Fig. 9, following which said coil member and the conduit are bent and curved as desired as indicated in full lines in Fig. 9. Clips 19 are mounted on the member 18 for securing it in the desired bent and curved formation to the wall or structural member 20 of the aircraft. Fastenings 21 secure the clips to the conduit and to the wall 20.

It is seen with reference to Fig. 10 that the coiled supporting member 18 fits snugly around the conduit to form a protective covering and to serve the same purposes as other forms of my invention hereinbefore described. Use of this form of my invention will prevent damaging distortion or buckling of the conduit during the bending thereof but does not limit the bend to a particular radius as is the case with the preformed channeled members 1 having a definite curve. In view of the flexibility of this coiled member it may be installed in various positions and to structural members of different shapes and angular relations to one another.

It should be noted that the base plates here employed are shaped to present surfaces which will engage and close the channeled sides of the supporting member 1. In one instance as shown in Figs. 1 and 2 the plate is flat and L-shaped so that a plane surface thereof is disposed to close the channeled side of member 1 whereas in the curved plate shown in Figs. 3 and 4, the curvature of the plate is in the direction of its length and corresponds to that of the supporting member 1 to support and close the channeled side of the latter.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a device for supporting an aircraft conduit which is bent to form a curved portion intermediate its ends to change the direction of extension of the conduit, an elongated, curvilinear conduit-supporting member embracing and extending longitudinally of the curved portion of the conduit and the portions extending therefrom, means for securing said supporting member to a structural part of the aircraft, said supporting member being of channeled cross section throughout its length and receiving the conduit in the channel thereof, said securing means including a base plate, and means for securing the supporting member to said base plate with the channeled side thereof opposed to and closed by said plate.

2. In a device for supporting an aircraft conduit which is bent to form a curved portion intermediate its ends to change the direction of extension of the conduit, an elongated, curvilinear conduit-supporting member embracing and extending longitudinally of the curved portion of the conduit and the portions extending therefrom, said member being channeled longitudinally, a base plate adapted to be secured to a structural part of an aircraft, and means for securing said member to said base plate with the channeled side thereof closed by said plate.

3. In a device for supporting an aircraft conduit which is bent to form a curved portion intermediate its ends to change the direction of extension of the conduit, an elongated, curvilinear conduit-supporting member embracing and extending longitudinally of the curved portion of the conduit and the portions extending therefrom, said member being channeled longitudinally, a base plate adapted to be secured to a structural part of an aircraft, and means for securing said member to said base plate with the channeled side thereof closed by said plate and with portions of the supporting member in contact with said structural part.

4. In a device for supporting an aircraft conduit which is bent to form a curved portion intermediate its ends to change the direction of extension of the conduit, an elongated, curvilinear conduit-supporting member embracing and extending longitudinally of the curved portion of the conduit and the portions extending therefrom, means for securing said supporting member to a structural part of the aircraft, said supporting member being of channeled cross section throughout its length and receiving the conduit in the channel thereof, said securing means including a base plate, and means for securing the supporting member to said base plate with the channeled side thereof opposed to and closed by said plate, said base plate being curved in the direction of its length in correspondence to the curvature of said supporting member.

5. In a device for supporting an aircraft conduit which is bent to form a curved portion intermediate its ends to change the direction of extension of the conduit, an elongated, curvilinear conduit-supporting member embracing and extending longitudinally of the curved portion of the conduit and the portions extending therefrom, means for securing said supporting member to a structural part of the aircraft, said supporting member being of channeled cross section throughout its length and receiving the conduit in the channel thereof, said securing means including a base plate, and means for securing the supporting member to said base plate with the channeled side thereof opposed to and closed by said plate, said plate having a curved mid-portion and angularly related portions extending therefrom.

RUSS CLYDE JORDAN.